United States Patent
Johnson et al.

[11] Patent Number: 6,126,140
[45] Date of Patent: Oct. 3, 2000

[54] MONOLITHIC BI-DIRECTIONAL MICROVALVE WITH ENCLOSED DRIVE ELECTRIC FIELD

[75] Inventors: Burgess R. Johnson, Bloomington; Daniel W. Youngner, Maple Grove, both of Minn.; S. Kimura, Hadano, Japan

[73] Assignee: Honeywell International Inc., Morristown, N.J.

[21] Appl. No.: 08/999,169

[22] Filed: Dec. 29, 1997

[51] Int. Cl.[7] .............................. F16K 31/02; F16K 7/14
[52] U.S. Cl. .............................. 251/129.01; 137/129.17; 251/331
[58] Field of Search .............................. 251/129.01, 331; 137/129.17

[56] References Cited

U.S. PATENT DOCUMENTS

| | | | |
|---|---|---|---|
| 4,826,131 | 5/1989 | Mikkor | 251/129.17 |
| 5,065,978 | 11/1991 | Albarda et al. | 251/129.17 X |
| 5,082,242 | 1/1992 | Bonne et al. | |
| 5,176,358 | 1/1993 | Bonne et al. | |
| 5,180,623 | 1/1993 | Ohnstein | |
| 5,216,273 | 6/1993 | Doering et al. | 251/129.17 X |
| 5,244,537 | 9/1993 | Ohnstein | |
| 5,323,999 | 6/1994 | Bonne et al. | |
| 5,441,597 | 8/1995 | Bonne et al. | |
| 5,452,878 | 9/1995 | Gravesen et al. | 251/129.01 X |
| 5,538,221 | 7/1996 | Joswig | 251/129.17 |
| 5,660,370 | 8/1997 | Webster | 251/129.17 |
| 5,897,097 | 4/1999 | Biegelsen et al. | 251/129.01 |

FOREIGN PATENT DOCUMENTS 286258  10/1995  Japan .

OTHER PUBLICATIONS

Scheeper, Voothuyaen, Olthuis,Bergveld, "Investigation of attractive forces between PECVD silicon nitride microstructure and an oxidized silicon substrate", Sensor and Actuators A, 30 (1992).

Lee, Hamilton, Trevino, "Low Power, tight Seal, Polyimide Electrostatic Valve," DSC–vol. 59, Microelectromechanical Systems (MEMS) ASME 1996.

DeBoer et al., "Measuring and Modeling Electrostatic Adehesion in Micromachines," Transducers '97 (Jun. 16–20, 1997.

Bertz,Schubert,Werner, "Silicon Grooves with Sidewall Angles down to 1° made by Dry Etching".

Bustgens,Bacher,Menz,Schomburg, "Micropump Manufactured by Thermoplastic Molding" MEMS 1994.

Wagner,Quenzer, Hoerschelmann,Lisec,Juerss, "Bistable Microvalve with Pneumatically Coupled Membranes," 0–7803–2985–Jun. 1996 IEEE (1996).

(List continued on next page.)

Primary Examiner—John Rivell
Assistant Examiner—Meredith H Schoenfeld
Attorney, Agent, or Firm—John G. Shudy, Jr.

[57] ABSTRACT

A monolithic, bi-directional micro device formed on a support base, for example a silicon wafer, including at least one input and output flow channels for flow of fluid. The actuator portion includes electrically conducting upper lower diaphragms (preferably formed from doped polycrystalline silicon) formed about a central electrode and mounted on the base. The diaphragms move under electrostatic force between first and second positions upon application of voltage. The upper and lower diaphragms form a sealed, enclosed cavity separated from the channels. The diaphragms are connected for mechanically transmitting electrostatically induced force from one diaphragm to the other, preferably by one or more posts passing through at least one hole formed in the central electrode. The lower diaphragm and the support base are maintained at the same electrical potential. The device is formed by depositing and patterning the electrodes and forming spaces between the electrodes by etching of sacrificial layers. One or more input flow channels and/or output flow channels are etched in the support base from either the frontside or the backside. Electrical contacts are formed by etching and metalizing pads to provide electrical paths for voltage to be selectively applied to the capacitor electrodes.

14 Claims, 3 Drawing Sheets

OTHER PUBLICATIONS

Branebjerg,Gravesen "A New Electrostatic Actuator Providing Improved Stroke Length and Force," Micro Electro Mechanical Systems (Feb. 4–7, 1992).

Cabuz, "Tradeoffs in MEMS Materials", SPIE vol. 2881, p. 160 (Oct. 96).

Shikida, Sato Characteristics of an Electrostatically–Driven Gas Valve under High Pressure Conditions.

Shikida,Sato,Harada, "Fabrication of an S–Shaped Microactuator," Journal of Microelectromechanical Systems, vol. 6 No. 1 (Mar. 1997).

Shikida,Sato,Tanaka,Kawamura,Fujisaki "Electrostatically–Actuated Gas Valve with large Conductance", $7^{th}$ Intl. Conf. On Solid–State Sensors and Actuators, J. Microelectromech. Syst. vol. 3, No. 2 (Jun. 1994).

B.Halg, "On a Nonvolatile Memory Cell Based on Micro–Electro–Mechanics," Proceedings of MEMS CH2832–4 /90/0000–0172 IEEE (1990).

Srinivasan et al, "Seld–Assembled flurocarbon Films for Enhanced Stiction Reduction".

Deng, Collins, Mehregany, Sukenik, "Performance Impact of Monolayer Coatingof Polysilicon Micromotors" (1995).

Elders, Jansen, Elwenspoek, "Materials Analysis of Fluorocarbon Films for MEMS Applications".

Tas,Sonnenberg,Jansen,Legtenberg,Elwenspoek, "Stiction in surface micromaching," J.Micromech. Microeng. 6 (1996).

Robertson,Wise "An Electrostatically–Actuated Microvalve for Semiconductor Gas Flow Control", Solid State Sensor and Actuator Workshop (Jun. 2–6, 1996).

Ohnstein,Fukiura,Ridley,Bonne "Micromachined Silicon Microvalve", Proceedings of MEMS, IEEE Microelectro Mechanical Systems, Napa Valley,CA. (Feb. 11–14, 1990).

Toshiyoshi, Fujita, "Electrostatic Micro Torsion Mirrors for an Optical Switch Matrix", Journal of Microelectromechanical Systems, vol.5, No. 4 (Dec. 1996).

Deng,Mehregany,Sukenik, "Performance Impact of Monolayer Coating of Polysilicon Micromotors," 0–7803–2503–6 IEEE (1995).

Maboudian and Howe, "Critical Review: Adhesion in Surface Micromechanical Structures," J.Vac.Sci.Technol. B 15(1) (Jan./Feb. 1997).

Houston,Maboudian,Howe "Assembled Monolayer Films as Durable Anti–Stiction Coatings for Polysilicon Microstructures," Solid–State Sensor and Actuator Workshop (Jun. 2–6, 1996).

Alley,Cuan,Howe,Komvopoulos, "The Effect of Release–Etch Processing on Surface Microstructure Stiction," 0–7803–0456–X/92 IEEE (1992).

Man,Gogoi,Mastrangelo, "Elimination of Post–Release Adhesion in Microstructures using Conformal Fluorocarbon Coatings", Journal of Microelectromechanical systems, vol.6, No. 1 (Mar. 1997).

Gogoi,Mastrangelo, "Adhesion Release and Yield Enhancement of Microstructures Using Pulsed Lorentz Forces," Journal of Microelectromechanical Systems, vol. 4, No. 4 (Dec. 1995).

MONOLITHIC BI-DIRECTIONAL MICROVALVE WITH ENCLOSED DRIVE ELECTRIC FIELD

FIELD OF THE INVENTION

The present invention relates to a micro-machined micro device. More particularly the invention relates to a microvalve or micropump that is fabricated monolithically on a silicon wafer or other substrate.

BACKGROUND OF THE INVENTION

Microvalves and micropumps which have low power, high response speed and high reliability in the presence of mists and particulates in the flow channels have long been sought. Using electrostatic force as the power for the device, devices have been proposed which are expected to operate at high speed, using low power. However, these devices attract mists and particles in the flow channel to the surface of their electrodes by electrostatic force that is produced by those electrodes. This can cause charging of the insulator layer on the electrode surfaces, which in turn can result in permanent sticking of the surfaces and a permanently closed flow channel.

One means for overcoming sticking is the use of more powerful electrostatic forces, which may be applied in both directions. Many such devices also employ a second force, such as pneumatic pressure to actuate the device between an open and closed position.

To accomplish this sort of microvalve or micropump, it has been proposed to use a wafer bonding method to produce a structure having a central pillar connected to both upper and lower electrodes, both of which are conductive. A pillar is generally located above the flow inlet. A center electrode contains passivation on the portion facing the upper electrode, itself held on an insulated electrode holder, such that the pillar moves from one side to the other as electrostatic force is applied to each driving electrode.

The primary drawback from such a design is that it is difficult to construct and maintain in operation because the concept of stacking wafers requires a complicated, expensive manufacturing process using techniques that have not been fully developed. As a result, no such product is available at the present time.

It would be of great advantage in the art if a microvalve could be manufactured that would be bi-directional, operated by electrostatic forces, wherein the electrostatic field itself is enclosed in a sealed volume, thus isolating it from the gas or fluid being controlled.

It would be another great advance in the art if such a device could be prepared without bonding multiple wafers, without assembly and bonding of precisely aligned multiple wafers.

Other advantages will appear hereinafter.

SUMMARY OF THE INVENTION

It has now been discovered that the above and other objects of the present invention may be accomplished in the following manner. Specifically, the present invention provides a microvalve or micropump in which the electrostatic forces are separated from the fluid being transferred in the device. A mechanical link is also provided, making the device bi-directional, to transfer electrostatically generated force exerted on one diaphragm to a second diaphragm.

The actuator of the present invention comprises an upper and lower sealed, flexible electrically conducting diaphragms and a thick, rigid central electrode. These elements are fabricated from doped polycrystalline silicon (polysilicon). The sealed diaphragms form electrodes of two capacitors, with the central electrode being the common electrode for the two capacitors. The microvalve is driven by electrostatic forces between the capacitor electrodes. The two diaphragms are mechanically connected by one or more posts which each pass through one or more holes in the central electrode. The post or posts cause the electrostatic force on one diaphragm to be mechanically transmitted to the other diaphragm. The electrode spacings in the two capacitors are tapered to apply significant electrostatic force on the flexible diaphragms in the region where the electrode spacing is small. Applying a voltage between the central and upper electrodes forces the valve to close, and applying a voltage between the central and lower electrodes causes the valve to open. The ability to apply force to the actuator in both directions allows surfaces that may be stuck together to be pulled apart, and also provides rapid actuation in both directions. The diaphragms can be made more flexible by providing corrugations on their perimeters to reduce required actuation forces.

The invention provides for a method of making the bi-directional device by monolithically fabricating it on a silicon wafer or other support base material. The capacitor electrodes are fabricated from doped polycrystalline silicon and the spaces between the electrodes are formed by sacrificial etching of silicon dioxide. The sequence begins by depositing and patterning all the layers of polycrystalline silicon and silicon dioxide on a base wafer. Sandwich layers of silicon nitride/silicon dioxide are also deposited and patterned, for insulation between capacitor electrodes. Other insulator materials with low leakage, high dielectric breakdown strength, and compatibility with the other materials could also be used. After depositing the layers, the input and/or output flow channels are etched through the support base from the back side (and front side, if needed), followed by sacrificial etching of the silicon dioxide and regrowth of a thin layer of silicon dioxide on the polycrystalline silicon surfaces to prevent electrical shorting. After the sacrificial silicon dioxide is removed and the polycrystalline silicon layers passivated with silicon dioxide insulator, the etching holes are plugged and electrical contacts are formed by etching and metalizing the pads.

The materials of construction for the preferred embodiment make the invention admirably suited for use with vacuum and at high temperatures. An excellent seal between the lower diaphragm and the valve seat is readily achieved. Moreover, the silicon dioxide and polycrystalline silicon materials do not cause out-gassing, in contrast to polymers and other materials.

BRIEF DESCRIPTION OF THE DRAWINGS

For a more complete understanding of the invention, reference is hereby made to the drawings, in which.

DETAILED DESCRIPTION OF THE PREFERRED EMBODIMENT

Figure 1:
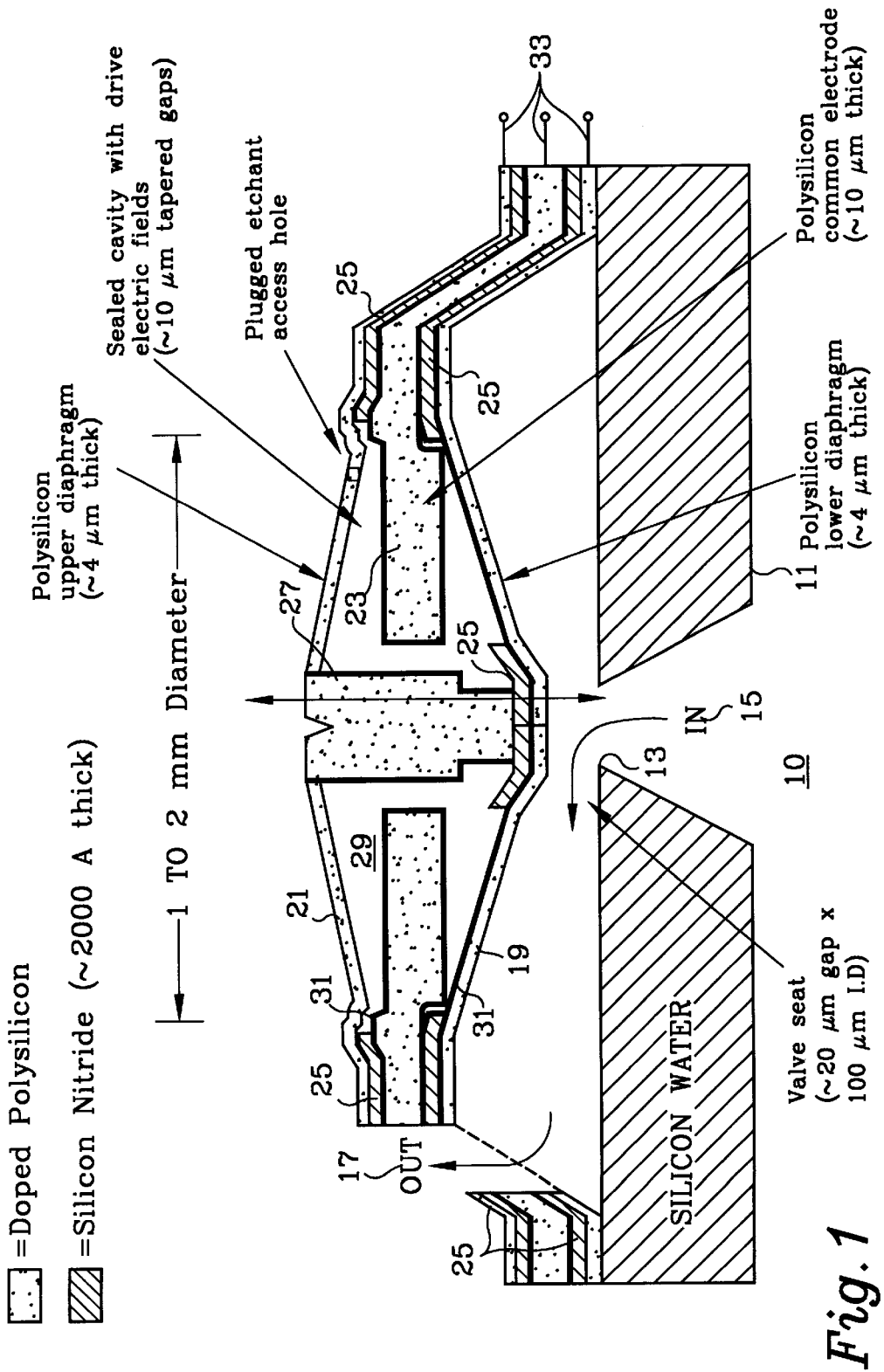
FIG. 1 is a schematic, sectioned view of the device of this invention.

The device of this invention is shown in FIG. 1 by reference numeral 10, generally. The device is generally circular in its preferred embodiment. A cylindrical base 11, made of silicon or other material, has a valve seat 13 etched therein, forming an input channel 15. Output channel 17, described hereinafter, could also be part of base 11, depending on the specific application for the device.

Positioned above base 11 are lower diaphragm 19 and upper diaphragm 21, separated by central electrode 23. Insulation 25 is used to prevent undesired contact between operative parts of the device. One or more posts 27 are fixedly attached to diaphragms 19 and 21 (through one or more holes in central electrode 23) to mechanically transmit force from one diaphragm to the other when electrostatic force causes the one diaphragm to move, as described below. Central post 27 closes off the valve inlet orifice 15 at seat 13, and thus should have a larger diameter than valve inlet orifice 15 to guarantee reliable sealing of the valve when closed. To close off a large diameter inlet orifice 15, it may be necessary to use a plurality of central posts, rather than just one as shown, to force a large diameter plate of thick polysilicon against seat 13. The diameter of each central post 27 is limited to only about twice the maximum thickness of polysilicon that can be deposited, which is about 10 microns. For high flow rate, the diameter of the valve seat 13 may need to be about 100 microns or larger.

Diaphragms 19 and 21 are formed from polysilicon and may be about 1 to 4 $\mu$m thick, while their diameter is about 1 to 2 mm. In a typical device, the maximum gap between the lower diaphragm 19 and valve seat 13 would be about 20 $\mu$m, and the valve inlet orifice 15 is about 100 $\mu$m inside diameter. The common electrode 23 is about 10 $\mu$m thick.

As can be seen in FIG. 1, the diaphragms 19 and 21 define a sealed cavity 29 in which all of the electrostatic field is contained, thus protecting the electrodes from contamination, shorting, and other adverse conditions. If the electric field were not isolated from the gas or fluid being controlled, mists or other particles in the fluid could be attracted to the capacitor electrodes and interfere with the operation of the valve, such as by preventing it from closing properly or completely, or by making it impossible to open the valve, due to charging of the insulating surfaces of the electrodes. The gaps 31 inside cavity 29 are tapered, with the gap spacing going to nearly zero at the outer edges of the gaps 31. The surfaces of the electrodes inside cavity 29 are coated with a thin dielectric to prevent electrical shorting when diaphragms 19 and 21 contact the central electrode 23.

Volume 29 can be evacuated or filled with a controlled composition of gas or liquid in order to prevent interior surfaces from sticking to each other. The fluid, either gas or liquid, in volume 29 may also be selected to have a high dielectric breakdown strength, allowing a higher electric field and thus larger force between the capacitor electrodes. Additional holes in central electrode 23 would allow the fluid to pass between upper and lower diaphragms 19 and 21. Electrodes 33 are connected to a pulsed or DC voltage source, not shown, for application of voltage to either diaphragm electrode 19 or 21 and the central electrode 23. Lower diaphragm 19 and support base 11 are maintained at the same potential so that no electric field is present in the flow channel. When a voltage is applied to lower diaphragm 19, it is attracted electrostatically to central electrode 23 and the valve inlet 15 is opened. Upper diaphragm electrode 21 is forced away from central electrode 23 by post 27. Conversely, when potential is applied to upper diaphragm electrode 23, it is electrostatically driven to central electrode 23, wherein post 27 moves lower diaphragm electrode 19 to close valve inlet 15.

Figure 2:
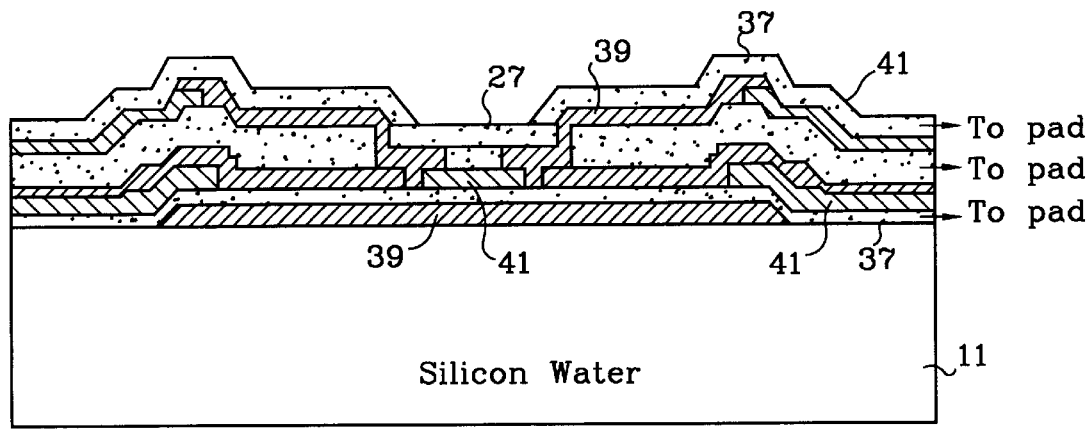
FIG. 2 is a schematic, sectioned view illustrating the first steps in the process of this invention.
Figure 3:
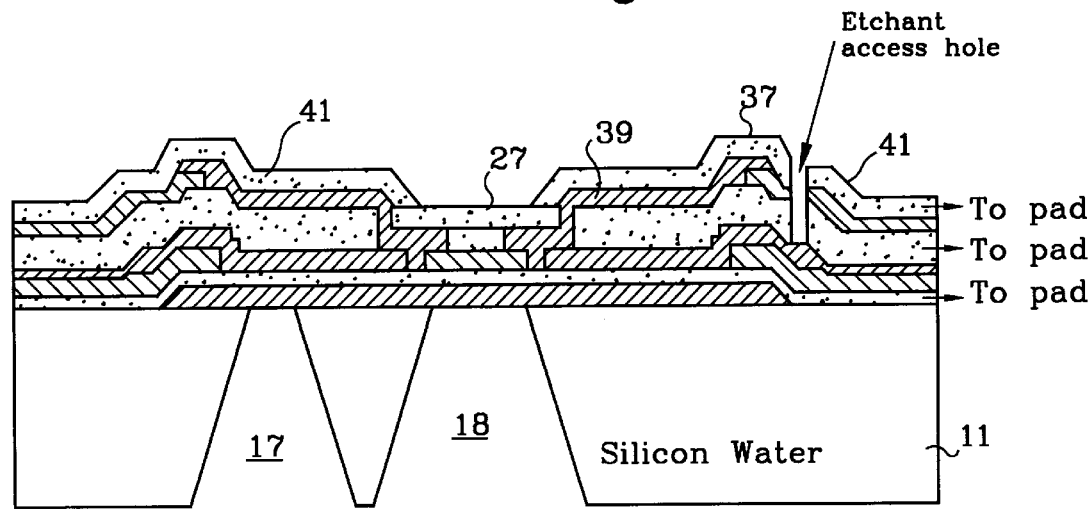
FIG. 3 is a schematic, sectioned view illustrating the intermediate steps in the process of this invention.
Figure 4:
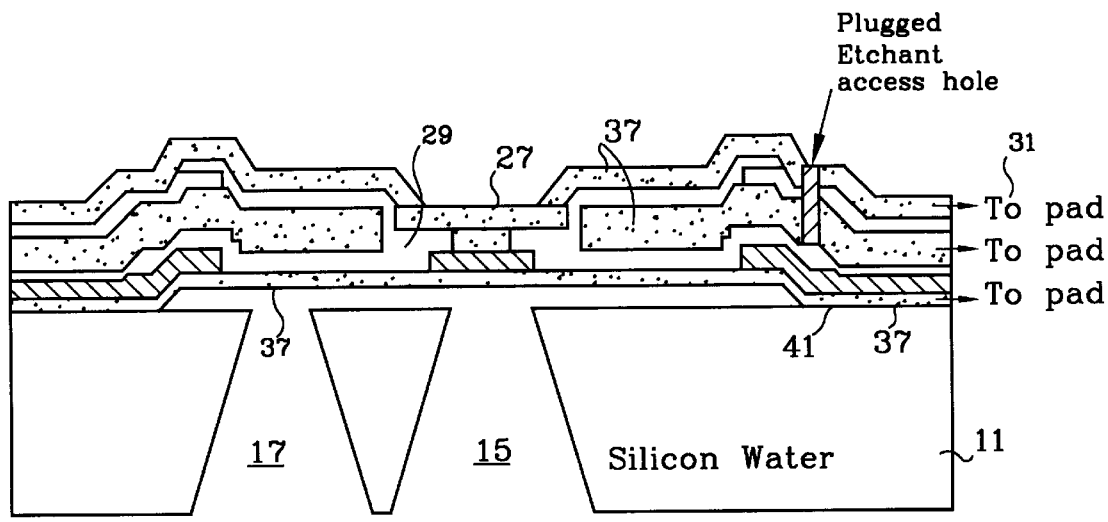
FIG. 4 is a schematic, sectioned view illustrating the final steps in the process of this invention.

The process sequence for fabricating the device of this invention is shown sequentially in FIGS. 2–4. The capacitor electrodes or diaphragms 19 and 21 are fabricated from doped polycrystalline silicon, and the spaces between the electrodes are formed by sacrificial etching of silicon dioxide. One preferred material is low temperature silicon dioxide or LTO. FIG. 2 illustrates the beginning of the fabrication process by depositing and patterning all the layers of polycrystalline silicon 37 and silicon dioxide 39 on the support base. Sandwich layers of an insulator such as silicon nitride/silicon dioxide 41 are also deposited and patterned to act as insulating spacers between polycrystalline silicon materials 37. Other dialectics with high breakdown strength and low leakage may also be used. The silicon dioxide in layers 41 is patterned so that it is not exposed to the etchant that is later used to remove the sacrificial silicon dioxide 39. These layers are fabricated using conventional deposition and photolithography processes.

After depositing and patterning all the layers, input and output flow channels 15 and 17 are etched through wafer 11 from the back side, as shown in FIG. 3. If the support base 11 is silicon, then the etching can be done with a wet etch in ethylene diamine pyrocatechol, which will not etch into the silicon dioxide layer 39 on the front surface of silicon wafer 11. Holes are also etched into the front side of the wafer to expose the sacrificial silicon dioxide 39 filling the actuator cavity, using a dry plasma etch process with gases such as sulfur hexafluoride. The sacrificial silicon dioxide 39 is then removed from the actuator cavity and the valve seat region, as shown in FIG. 4, using, for example, anhydrous hydrofluoric acid vapor.

After removal of the sacrificial silicon dioxide 39, a thin layer of silicon dioxide may be thermally re-grown on all the polycrystalline silicon surfaces to prevent electrical shorting when electrodes touch each other. Alternatively, layers of a high quality (low electrical leakage) insulating dielectric could be deposited and patterned on all surfaces of the cavity 29 before removing the sacrificial silicon dioxide.

After the sacrificial silicon dioxide 39 has been removed and the polycrystalline silicon layers are passivated by a thin layer of silicon dioxide, holes that allowed the silicon dioxide to be etched from the front side are plugged, as shown in FIG. 4, done by atmospheric pressure chemical vapor deposition of silicon dioxide.

Finally, electrical contacts are formed by etching the insulating layer over the polycrystalline silicon in the contact pad regions, and metalizing the pads for connection to electrodes 33 shown in FIG. 1.

Bi-directional microvalves of the present invention are designed to operate on an on/off flow ratio of greater than 100 for air, with about one atmosphere of pressure drop when the device is closed. It is operated at a maximum flow rate of about 100 cc/min. with about five psi pressure drop when fully open. The operating voltage requires about 20 to 50 volts to open or close the device.

The devices of this invention operate in such a manner as to prevent stiction, or the sticking of a diaphragm to an electrode after having been attracted thereto by electrostatic force. By isolation of electric fields from the flow channels, as has been accomplished herein, larger electric fields may be used without the onset of stiction, thus generating greater force or more rapid response. The device may be used over a much wider range of applications than prior devices. It may be used with flammable liquids and gases, such as methane and the like; with conducting liquids such as tap water; in dirty environments without regard for electrostatic force on charged dust particles; in micropumps; in a microfluidic system on a chip; and as an electrical relay.

The device of the present invention is admirably suited for use as a primary pilot valve. Also, it is intended to be employed in gas sampling devices for sensors, in chemical analysis using fluidic systems on a chip, in chromatography and in many various medical devices. Other uses include applications with micro-analyzers for chemical and biological warfare agents.

While particular embodiments of the present invention have been illustrated and described, it is not intended to limit the invention, except as defined by the following claims.

We claim:

1. A micro device, comprising:

a support base, including at least one input or output flow channels for flow of fluid;

an upper diaphragm and a lower diaphragm formed about a central electrode and mounted on said base, said diaphragms being electrically conducting and adapted to move under electrostatic force between a first position and a second position upon selective application of a voltage difference between one of said diaphragms and said central electrode, said upper and lower diaphragms forming a sealed, enclosed cavity separated from said channels; and a connector connecting said diaphragms for mechanically transmitting electrostatically induced force on one said diaphragm to the other said diaphragm.

2. The device of claim 1, wherein said lower diaphragm in said second position prevents flow through said at least one input or output flow channel.

3. The device of claim 1, wherein said lower diaphragm and said support base are maintained at the same electrical potential.

4. The device of claim 1, wherein said central electrode includes at least one hole formed therein and said connector connecting said diaphragm means is positioned in said at least one hole.

5. The device of claim 1, wherein said diaphragms are formed from doped polycrystalline silicon.

6. The device of claim 1, wherein said base is silicon.

7. The device of claim 1 connected to at least one similar device on said base by flow channels in said base.

8. A micro device, comprising:

support base means for supporting said device, including at least one input or output flow channel means for flow of fluid;

upper diaphragm means and lower diaphragm means for movement on said base and formed about a central electrode means and mounted on said base, said upper and lower diaphragm means being electrically conducting and adapted to move under electrostatic force between a first position and a second position upon selective application of a voltage difference between one of said diaphragm means and said central electrode means, said upper and lower diaphragm means forming a sealed, enclosed cavity separated from said channels; and means connecting said diaphragm means for mechanically transmitting electrostatically induced force on one said diaphragm means to the other said diaphragm means.

9. The device of claim 8, wherein said lower diaphragm means in said second position prevents flow through said at least one input or output flow channel means.

10. The device of claim 8, wherein said lower diaphragm means and said support base are maintained at the same electrical potential.

11. The device of claim 8, wherein said central electrode means includes at least one hole formed therein and said means connecting said diaphragm means is positioned in said at least one hole.

12. The device of claim 8, wherein said diaphragm means are formed from doped polycrystalline silicon.

13. The device of claim 8, wherein said base is silicon.

14. The device of claim 8 connected to at least one similar device on said base by flow channel means in said base for connection thereof.

* * * * *